US006944639B2

(12) United States Patent
Launiainen

(10) Patent No.: US 6,944,639 B2
(45) Date of Patent: Sep. 13, 2005

(54) HARDWARE CONTEXT VECTOR GENERATOR FOR JPEG2000 BLOCK-CODING

(75) Inventor: Aki Launiainen, Tampere (FI)

(73) Assignee: Nokia Corporation, Espoo (FI)

( * ) Notice: Subject to any disclaimer, the term of this patent is extended or adjusted under 35 U.S.C. 154(b) by 527 days.

(21) Appl. No.: 10/179,367

(22) Filed: Jun. 25, 2002

(65) Prior Publication Data

US 2003/0039400 A1 Feb. 27, 2003

Related U.S. Application Data

(60) Provisional application No. 60/302,447, filed on Jun. 29, 2001.

(51) Int. Cl.7 .................................................. G06F 1/02
(52) U.S. Cl. ....................................... 708/270; 708/203
(58) Field of Search ......................... 382/240, 247–248; 708/203, 270

(56) References Cited

U.S. PATENT DOCUMENTS

| | | | | |
|---|---|---|---|---|
| 5,680,129 A | | 10/1997 | Weinberger et al. | 341/65 |
| 5,835,034 A | | 11/1998 | Seroussi et al. | 341/65 |
| 6,587,588 B1 | * | 7/2003 | Bottou et al. | 382/248 |
| 6,822,587 B2 | * | 11/2004 | Henry | 341/50 |
| 2003/0053702 A1 | * | 3/2003 | Hu | 382/240 |
| 2003/0133500 A1 | * | 7/2003 | Auwera et al. | 375/240.11 |

* cited by examiner

*Primary Examiner*—Tan V. Mai
(74) *Attorney, Agent, or Firm*—Cohen, Pontani, Lieberman & Pavane

(57) ABSTRACT

A hardware context vector codec/generator which can be used in the block coder of a discrete wavelet transform (DWT) codec. The context vector codec/generator consists mostly of three columns of context vector registers where the context vectors move in parallel from column to column while the bits in the context vectors are modified by digital logic gates placed before each column. The digital logic gates are controlled by the results of the block coder scanning quantized wavelet coefficients. The preferred embodiment is used in a JPEG2000 codec.

23 Claims, 13 Drawing Sheets

FIG.3
PRIOR ART

| | | | | | | | |
|---|---|---|---|---|---|---|---|
| $a_1$ | $a_2$ | $a_3$ | $a_4$ | $i_1$ | $i_2$ | $i_3$ | $i_4$ |
| $b_1$ | $b_2$ | $b_3$ | $b_4$ | $j_1$ | $j_2$ | $j_3$ | $j_4$ |
| $c_1$ | $c_2$ | $c_3$ | $c_4$ | $k_1$ | $k_2$ | $k_3$ | $k_4$ |
| $d_1$ | $d_2$ | $d_3$ | $d_4$ | $l_1$ | $l_2$ | $l_3$ | $l_4$ |
| $e_1$ | $e_2$ | $e_3$ | $e_4$ | $m_1$ | $m_2$ | $m_3$ | $m_4$ |
| $f_1$ | $f_2$ | $f_3$ | $f_4$ | $n_1$ | $n_2$ | $n_3$ | $n_4$ |
| $g_1$ | $g_2$ | $g_3$ | $g_4$ | $o_1$ | $o_2$ | $o_3$ | $o_4$ |
| $h_1$ | $h_2$ | $h_3$ | $h_4$ | $p_1$ | $p_2$ | $p_3$ | $p_4$ |

HARDWARE CONTEXT VECTOR GENERATOR FOR JPEG2000 BLOCK-CODING

RELATED APPLICATIONS

This application claims priority from U.S. Provisional Patent Application Ser. No. 60/302,447 which was filed on Jun. 29, 2001.

BACKGROUND OF THE INVENTION

1. Field of the Invention

The present invention relates to digital image compression techniques in general, and, in particular, to hardware for performing embedded block coding in a JPEG2000 codec.

2. Description of the Related Art

With the expansion of the Internet as well as the explosive growth of digital storage devices, the use of compression techniques for storing and transporting multimedia content is becoming increasingly important. One multimedia compression protocol is JPEG (Joint Photographic Experts Group) which is used for storing still photographs or images. The original JPEG standard was created in the late 1980s and has become widely used on the Internet as well as in digital imaging equipment. In 1997, a call for proposals for the next generation JPEG standard, called JPEG2000, was issued by the International Organization for Standardization (ISO), under whose aegis the original JPEG standard was promulgated. The first part of the draft standard (ISO/IEC 15444-1: JPEG2000 image coding system) was released in 2000.

JPEG2000 supports both lossy and lossless compression of single-component (e.g., greyscale) and multi-component (e.g., color) imagery. In addition to this basic compression functionality, other features are provided, including 1) progressive recovery of an image by fidelity or resolution; 2) region-of-interest coding, whereby different parts of an image may be coded with differing fidelity or resolution; 3) random access to specific regions of an image without needing to decode the entire codestream; 4) flexible file format; and 5) good error resilience. Due to its improved coding performance and many attractive features, there is a very large potential application base for JPEG2000. Some potential application areas include: image archiving, web browsing, document imaging, digital photography, medical imagery, and remote sensing.

As shown in FIG. 1, the JPEG2000 encoding process can be broken down into various steps. In the DC Level Shifting step 110, DC level shifting and, optionally, a forward component transform is performed on tiles of the original image. Any still image may be divided into tiles, which are rectangular arrays that include the same relative portion of the components that make up the image. In the DWT step 120, the tile components are decomposed using a Discrete Wavelet Transform (DWT), thus producing wavelet coefficients. The use of DWT provides the multi-resolution capabilities of JPEG2000. As shown in FIG. 2, a first DWT stage decomposes the original image ($LL_0$) into four sub-bands, denoted by the labels $LL_1$, $HL_1$, $LH_1$, and $HH_1$. The labels indicate the filtering and decomposition level ($LL_1$=low-pass filtering horizontally, low-pass filtering vertically, at the 1st level of decomposition). These sub-bands are populated with wavelet coefficients that describe spatial frequency characteristics of the original image. The second stage further breaks down $LL_1$ into the four sub-bands $LL_2$, $HL_2$, $LH_2$, and $HH_2$. Although only three such stages are shown in FIG. 2, this process may continue for many stages. Each $LL_n$ sub-band is a reasonable low resolution rendition of $LL_{n-1}$ with half the width and height.

Returning to FIG. 1, each sub-band, comprised of coefficients produced in the DWT step, is subjected to uniform scalar quantization in the Quantization step 130. This step may be used to further compress the data stream by selecting a large quantization step size. However, the JPEG2000 standard does not require any particular method to select a step size, and each sub-band is allowed its own step size. Next, the quantized coefficients of the sub-bands are further broken down into two-dimensional arrays (e.g., 64×64 or 32×32 samples) called code-blocks. In the Block Coding, or Coefficient Bit Modeling, step 140, the code-blocks are coded with three coding passes, described below. Each of these coding passes collects contextual information about the bits in the coefficients of the code-blocks, and results in the generation of a coefficient vector for each coefficient in the code-block. The Arithmetic Coding step 150 uses the context vectors and the corresponding coefficients to create a compressed datastream, which may be interleaved in the Data Ordering step 160.

Because the present invention concerns the Block Coding, or Coefficient Bit Modeling, step 140, a more detailed description of that step will be made with reference to FIGS. 3 and 4. As stated above, the code-blocks of quantized coefficients are coded with three coding passes. These coding passes are performed on "bitplanes", each of which is an array consisting of bits taken from the same position in each coefficient. The first bitplane is comprised of the most significant bits (MSB) of all the coefficient magnitudes in the code-block. The second bit-plane is comprised of the second MSBs of all the coefficient magnitudes in the code-block, and so on. FIG. 3 shows a code-block of quantized coefficients, where each quantized coefficient has four bits (e.g., $a_1$ $a_2$ $a_3$ $a_4$) and the MSB of each coefficient has a subscript of "1" (e.g., $a_1$). The first bitplane is comprised of $a_1$, $b_1$, $c_1$, $d_1$, etc., the second bit-plane is comprised of $a_2$, $b_2$, $c_2d_2$, etc.

The number of bit-planes in a code-block that are identically zero is signaled as side information, and not encoded. Starting from the first bitplane having a single 1, each bitplane is encoded in three passes (referred to as sub-bitplanes). The three passes of the bit-planes are scanned in a particular pattern. Namely, the pattern starts at the top-left bit of the bit-plane, proceeds down through the next three bits in the bit-plane, and then continues at the next top-left bit and proceeds by making stripes of four bits until the width of the code-block is done. Once the end of the code-block is reached, the pattern starts with the next four bit stripe at the beginning of the code-block, as shown by FIG. 4. Thus, in FIG. 3, the scan pattern of the first bit-plane would be $a_1$, $b_1$, $c_1$, $d_1$, $i_1$,$j_1$, $k_1$, $l_1$, $e_1$, $f_1$, $g_1$, $h_1$, $m_1$, $n_1$, $o_1$, $p_1$.

This scan pattern is followed in each of the three coding passes. The decision as to in which pass a given bit is coded is made based on the "significance" of that bit's location and the significance of neighboring locations. A location is considered significant if a 1 has been coded for that location (quantized coefficient) in the current or previous bitplanes.

The first pass is called the significance propagation pass. A bit is coded in this pass if its location is not significant, but at least one of its eight-connected neighbors is significant. If a bit is coded in this pass, and the value of that bit is 1, its location is marked as significant for the purpose of coding subsequent bits in the current and subsequent bitplanes. Also, the sign bit is coded immediately after the 1 bit just coded.

The second pass is the magnitude refinement pass, where all bits from the locations that became significant in a previous bitplane are coded. The third and final pass is the clean-up pass, where bits not coded in the first two passes are taken care of. The result of these three scanning passes are the context vectors for the quantized coefficients.

At present, although hardware implementations of the JPEG2000 block encoder have been contemplated, a particular hardware implementation has not been devised. Several software implementations exist, such as JasPer (in C) and JJ2000 (in Java), but these are slow and CPU-intensive. Therefore, there is a need for hardware implementations of one or more of the various steps in the JPEG2000 encoding/decoding procedure.

SUMMARY OF THE INVENTION

The object of the present invention is to provide a hardware accelerator for context vector coding/decoding for use in a JPEG2000 codec.

To accomplish this and other objects, the present invention provides a device and method for processing context vectors in a block coder of a JPEG2000 codec. In one aspect, the present invention comprises three columns of context vector registers, three sets of digital logic gates on the input lines of the three columns of context vector registers, and a context vector memory. The context vector memory provides context vectors to the input lines of the first column of context vector registers, where they are processed through the first set of digital logic gates. The context vectors go from the first column to the second column of context vector registers through the second set of digital logic gates, and through the third set of digital logic gates when moving from the second column to the third column of context vector registers. The digital logic gates modify the bits of the context vectors during encoding/decoding. The results of the JPEG2000 codec scanning quantized discrete wavelet transform (DWT) coefficients are used to control the first, second, and third set of digital logic gates to thereby process the context vectors. After the third column of context vector registers, the context vectors return to the context vector memory through output lines.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 3 is a representation of a code-block of quantized coefficients;

DETAILED DESCRIPTION OF THE PRESENTLY PREFERRED EMBODIMENTS

The system and method according to the present invention are directed to a hardware accelerator which creates context vectors during encoding, and decodes context vectors during decoding. This context vector codec hardware accelerator will be part of a larger JPEG20000 codec, where the remaining JPEG2000 codec functions are performed in hardware, software, or a combination of both. For example, the context vector codec could be a co-processor, part of a dedicated JPEG2000 codec, and/or part of a larger hardware accelerator block.

Figure 1:
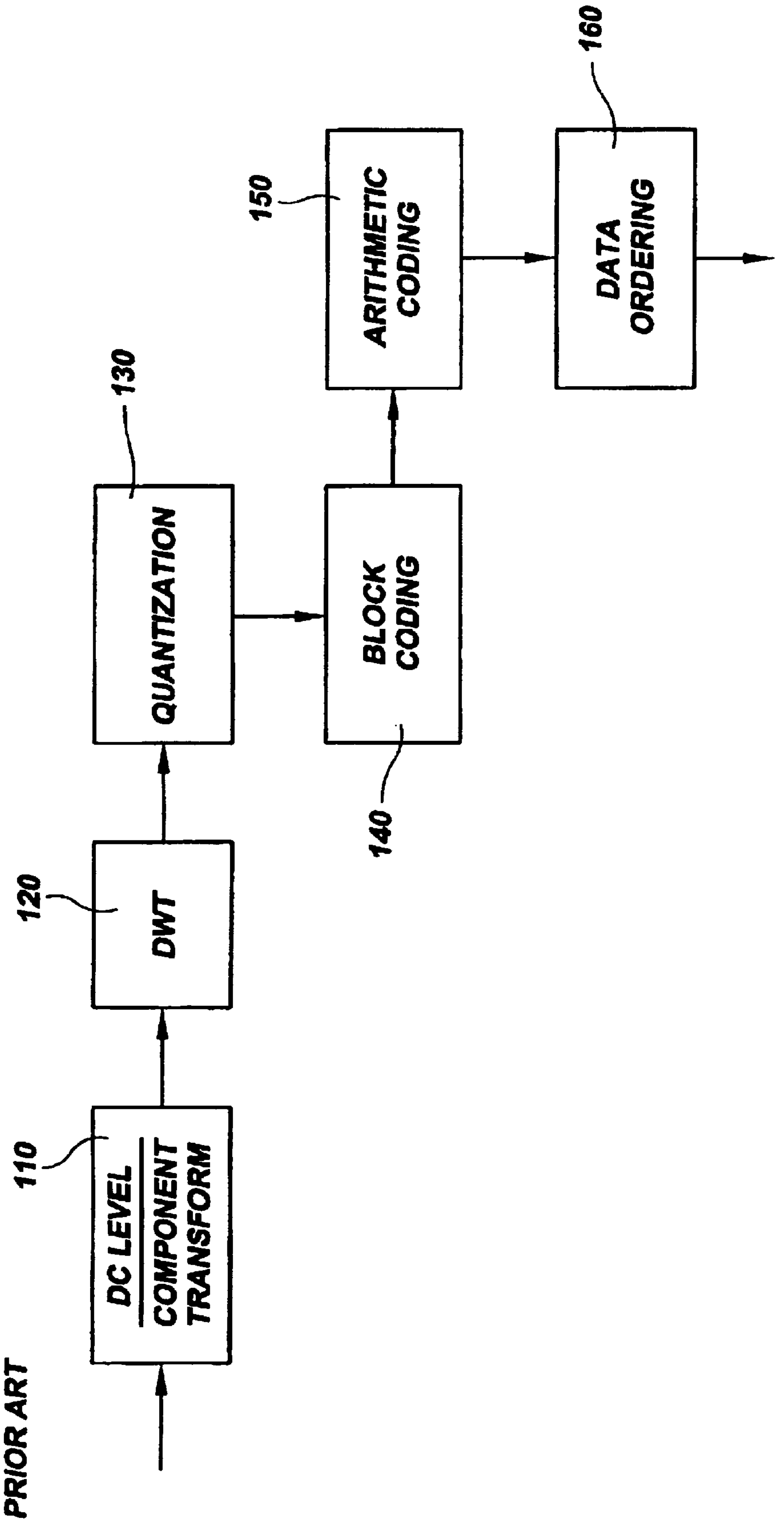
FIG. 1 is a schematic diagram of the JPEG2000 encoding process.
Figure 4:
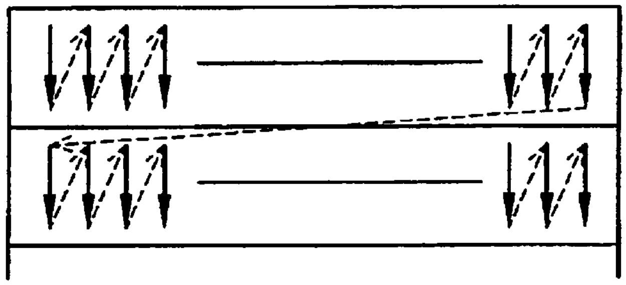
FIG. 4 shows the scan pattern used when block coding a code-block of quantized coefficients in the JPEG2000 standard.
Figure 2:
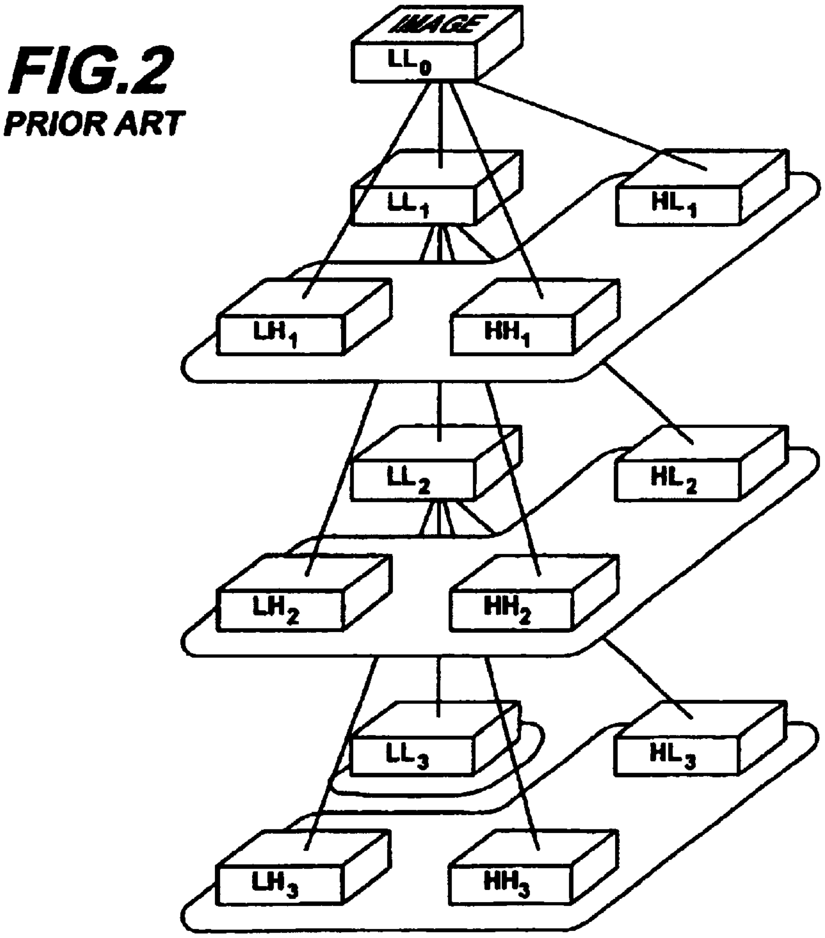
FIG. 2 is a schematic diagram of various levels of decomposition of tile components using a Discrete Wavelet Transform (DWT)
Figure 5:
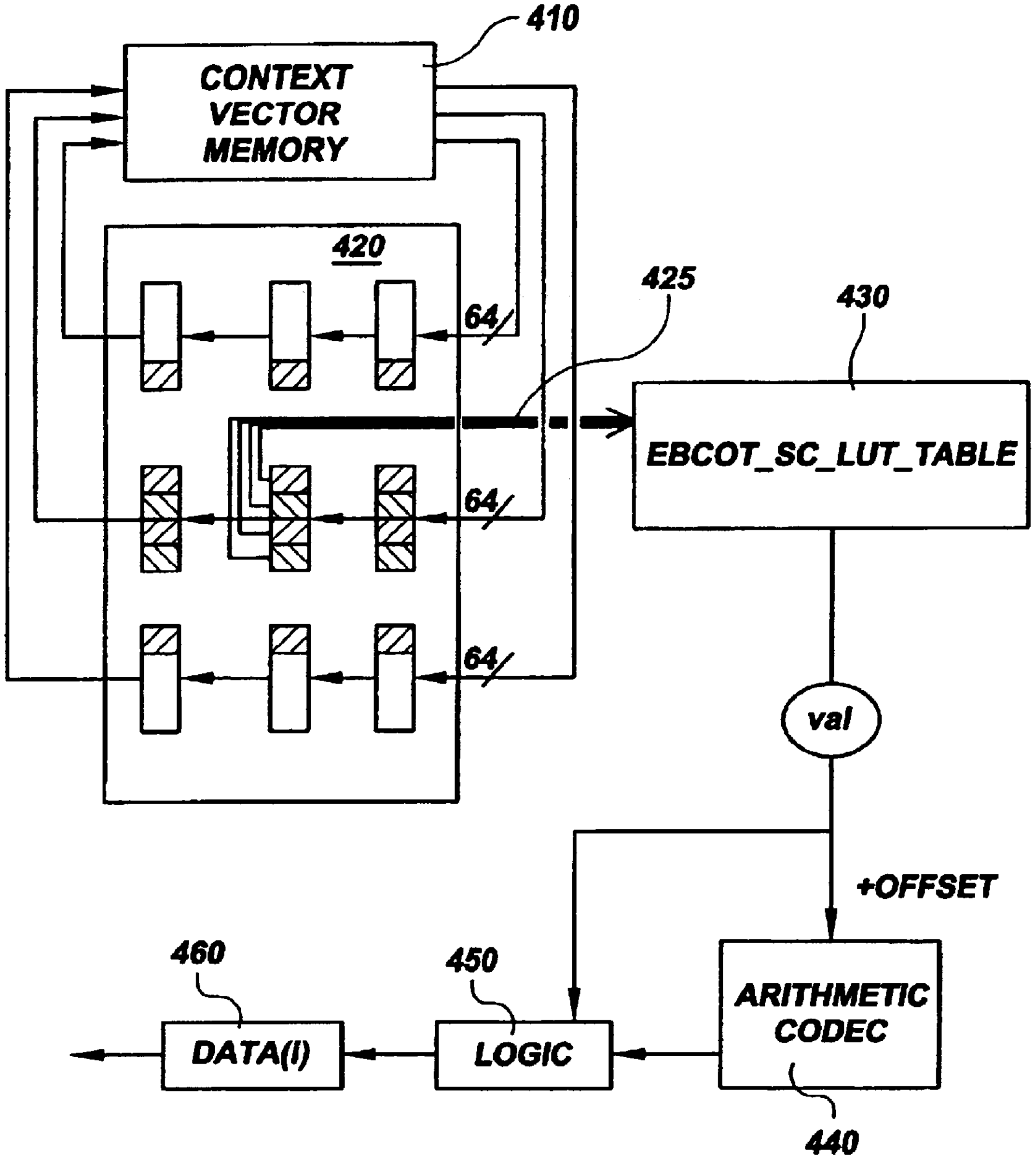
FIG. 5 is a block diagram of an exemplary hardware accelerator block of which the presently preferred embodiment of the present invention forms a part.

FIG. 5 is a block diagram of an example of a larger hardware accelerator block of which the presently preferred embodiment of the present invention forms a part. In FIG. 5, the data flow through the hardware accelerator block 401 is shown while performing decoding. More specifically, the flow of context vectors through the Context Vector Codec 420 and the flow of sign information 425 out of the Context Vector Codec into other components of the hardware accelerator block 401 are shown. Although the flow of sign information 425 is different during encoding, the context vector flow is the same whether the Context Vector Codec 420 is performing encoding or decoding. The flow is the same because the Context Vector Codec 420 is performing the same operation during encoding or decoding, i.e. creating context vectors from the scanning results of quantized coefficients, except that during decoding the quantized coefficients are estimated coefficients from the arithmetic codec. Thus, the device to which the present invention is directed may be referred to as a Context Vector Generator as well as a Vector Context Codec.

The context vectors are taken from Context Vector Memory 410 and enter the Context Vector Codec/Generator 420 from the right-hand side. The context vectors are each 16 bits long and are transferred using 64-bit wide busses. The context vectors are initialized to zero when the coding of a new coefficient block starts or a new coding pass starts (depending on the coding mode). Based on the values obtained when scanning the quantized coefficients (a process taking place elsewhere in the JPEG2000 codec), the bit values within the context vectors are changed by the Context Vector Codec/Generator 420 and then the context vectors are stored back into the Context Vector Memory 410. In addition, Context Vector Codec/Generator 420 produces sign information 425 as part of the context vector which is being currently processed, and this sign information 425 is input as an index to EBCOT_SC_LUT_TABLE (Embedded Block Coding Significance Context Look-Up Table) 430, which in turn produces context labels that are fed to Arithmetic Codec 440. Logic 450 contains logic for performing modifications during decoding. Data(i) 460 contains memory and address logic to store the decoded wavelet coefficient value to memory in the right position.

Figure 6:
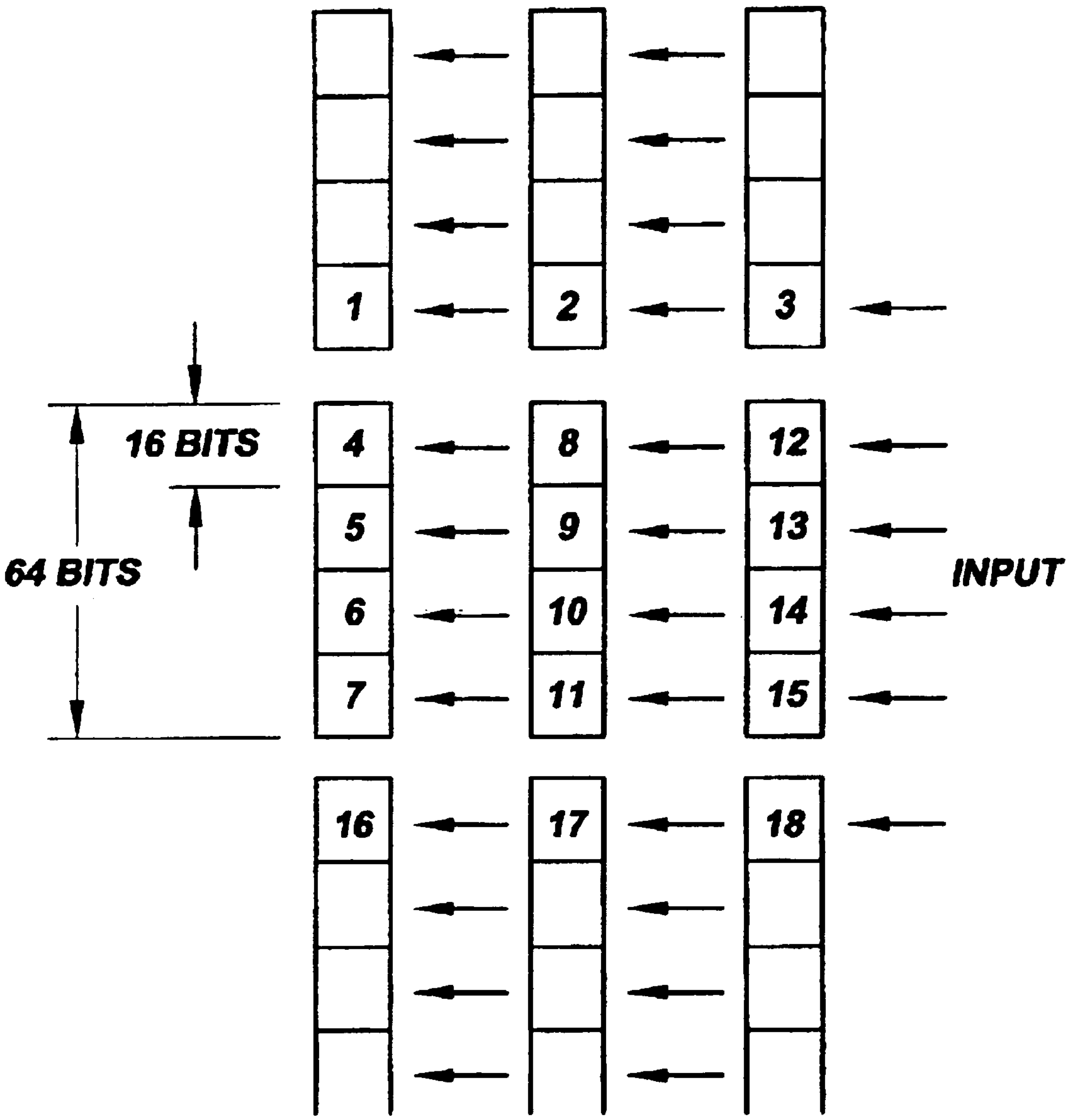
FIG. 6 is a block diagram of a Context Vector Codec according to the presently preferred embodiment of the present invention.

FIG. 6 is a block diagram of a Context Vector Codec/Generator according to the presently preferred embodiment of the present invention. The Context Vector Codec/Generator is comprised primarily of three columns of three 64-bit registers, where each 64-bit register contains 4 16-bit context vectors. Input, in the form of context vectors taken from memory (or zeroes), enters from the right-hand side of FIG. 6 to be manipulated by the control logic (not shown) within the Context Vector Codec. During different operations (described more fully below), the context vectors move from right to left through the registers.

To understand the operations of the Context Vector Codec/Generator as clearly as possible, some of the code from the present software verification model (Version 7.2) of the JPEG2000 standard is presented below.

```
cp[(-stripe_gap+3)-4)]      | = (non_causal << BR_POS);
cp[(-stripe_gap+3)+4)]      | = (non_causal << BL_POS);
cp[1-4]                     | = TR_SIG;
cp[1+4]                     | = TL_SIG;
if (val)
    { /* Negative sample    */
    cp[4]                   | = CL_SIG | H_NVE_SIG;
    cp[-4]                  | = CR_SIG | H_NVE_SIG;
    cp[(-stripe_gap+3)]     | = (non_causal << BC_POS) | (non_causal << V_NVE_POS);
    cp[1]                   | = TC_SIG | V_NVE_SIG;
    }
else
    { /* Positive sample    */
    cp[4]                   | = CL_SIC | H_PVE_SIG;
    cp[-4]                  | = CR_SIG | H_PVE_SIG;
    cp[(-stripe_gap+3)]     | = (non_causal << BC_POS) | (non_causal << V_PVE_POS);
    cp[1]                   | = TC_SIG | V_PVE_SIG;
    }
```

The following variables are being used in the above code fragment:

| | |
|---|---|
| cp | pointer to 16 bit context vector |
| val | current significant value from arithmetic coder |
| _SIG | significance |
| _POS | bit position |
| BR | Bottom Right |
| BL | Bottom Left |
| TR | Top Right |
| TL | Top Left |
| CL | Center Left |
| CR | Center Right |
| TC | Top Center |
| BC | Bottom Center |

V_PVE_POS indicates at least one vertical neighbor with a positive value

-continued

V_NVE_POS indicates at least one vertical neighbor with a negative value
H_PVE_POS indicates at least one horizontal neighbor with a positive value
H_NVE_POS indicates at least one horizontal neighbor with a negative value The above code is from part of the significance pass function in the verification model and, as the rest of the JPEG2000 standard, this code is only for the decoding procedure. The Context Vector Codec will be performing the same steps, but by means of digital logic in hardware, rather than by means of various procedures in software.

Figure 8:
FIG. 8 is a graphical representation of a 16-bit context vector.
Figure 7:
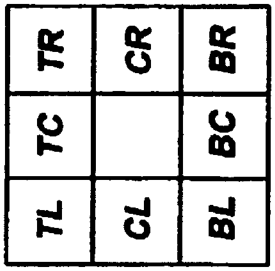
FIG. 7 is a graphical representation of the positions labelled by the two-letter abbreviations which indicate positions relative to the quantized coefficient corresponding to the context vector.

FIG. 7 is a graphical representation of the positions indicated by the two-letter abbreviations (e.g., CR, BL, etc.) above. They indicate positions relative to the quantized coefficient corresponding to the context vector. Thus, in a 16-bit context vector as shown in FIG. 8, the bits in the positions labelled BR, BC, etc., would be changed depending on whether the quantized coefficient in that relative position was significant. The REF bit indicates whether the context vector has been refined or not, and the SELF bit indicates whether the wavelet coefficient corresponding to the context vector is itself significant. H-NVE/H-PVE and V-NVE/NV-PVE are used to indicate whether a significant horizontal neighbor is positive or negative and whether a significant vertical neighbor is positive or negative, respectively. OUT_OF_BOUNDS is used to identify context words which lie beyond the boundaries of the codeblock.

Figure 9:
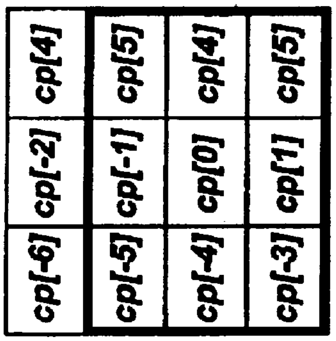
FIG. 9 is a graphical representation of the context vectors of quantized coefficients neighboring the quantized coefficient being currently analyzed, where each context vector is labelled by the context vector pointer.

Essentially, the above code segment is modifying the bits within the context vectors of quantized coefficients neighboring the quantized coefficient being currently analyzed. FIG. 9 is a representation of an array of context vectors corresponding to an array of quantized coefficients being scanned. In the above code segment, the context vector of the quantized coefficient being currently scanned is located at cp [0] in FIG. 9. The context vectors around cp [0] are shown in FIG. 9, where the neighbors of cp [0] are in a box with cp [0] in the center. If the quantized coefficient corresponding to cp [0] is significant, the corresponding bits in the context vectors of the neighboring quantized coefficients must be changed to indicate that fact. For instance, the context vector cp [−3] would need bit TR changed, because the quantized coefficient corresponding to cp [0] is located to the top right of cp [−3] . The if else statement in the code fragment set forth above changes the values of the bits in the neighboring context vectors to indicate whether the significant quantized coefficients neighboring the corresponding quantized coefficients were positive or negative.

Returning to the hardware Context Vector Codec/Generator according to the presently preferred embodiment of the present invention as represented in FIG. 6, it can be seen that, rather than using a pointer cp to load and store the various context vectors, the hardware Context Vector Codec/Generator loads the context vectors corresponding to an entire strip of quantized coefficients along with all of the neighboring quantized coefficients of the strip into its nine 64-bit wide registers. Once encoding has started, the registers labelled 8, 9, 10, and 11 in the center of the Context Vector Codec/Generator correspond to the current quantized coefficient stripe, and the surrounding registers correspond to its neighbors. Digital logic (shown below) under the control of state registers manipulate the bit values of the context vectors depending on the scanning passes being performed on the corresponding quantized coefficients.

The hardware Context Vector Codec/Generator according to the presently preferred embodiment of the present invention is directed based on an instruction set consisting of eight basic instructions: store_context, load_context, process_stage_1, process_stage_2, process_stage_3, process_stage_4, refined, and non-refined. The load_context instruction loads the context vectors from the Context Vector Memory into the three right-most registers in the Context Vector Codec/Generator and shifts the contents of all the registers in the Context Vector Codec/Generator left to the next register. The store_context instruction stores the context vectors from the three left-most registers back to the Vector Context memory. The refined, and non-refined instructions are used to change the refined bit REF in the context vectors of the current quantized coefficients. The process_stage_X instructions perform the operations which change the bits in the context vectors according to the scanning passes. These instructions also involve operations which do not take place in the Context Vector Codec/Generator.

When implementing these instructions, the host processor controls (either directly or indirectly) the operation sequences which occur within the Context Vector Codec/Generator. In general, the exact operation sequence to be performed is based on the contents of the block master data structure, which contains the information of the current coefficient block which is being processed. The block master data structure can be implemented in either software or hardware, depending on the embodiment. In the presently preferred embodiments, the block master data structure is implemented as hardware, specifically, as a register set. One of the registers is the current_pixel_values-register (which may be implemented as a set of 4 registers) which contains the quantized coefficient values of the stripe currently being scanned. This register (or set of registers) can be connected directly with the memory storage containing the coefficient values, or updated under control of the host processor. During encoding, this register is scanned to produce the information required to control the operation sequences in the Context Vector Codec/Generator.

The four different process_stage_X instructions perform the same operations, but on different context vectors and based on different control information. For example, process_stage_1 changes the bits in context vector registers 1, 2, 3, 4, 12, 5, 9, and 13 based on the scanning of the first quantized coefficient in the stripe (which corresponds to the context vector in register 8). Similarly, process_stage_2 changes the bits in context vector registers 4, 8, 12, 5, 13, 6, 10, and 14 based on the scanning of the second quantized coefficient in the stripe (which corresponds to the context vector in register 9).

Figure 10:
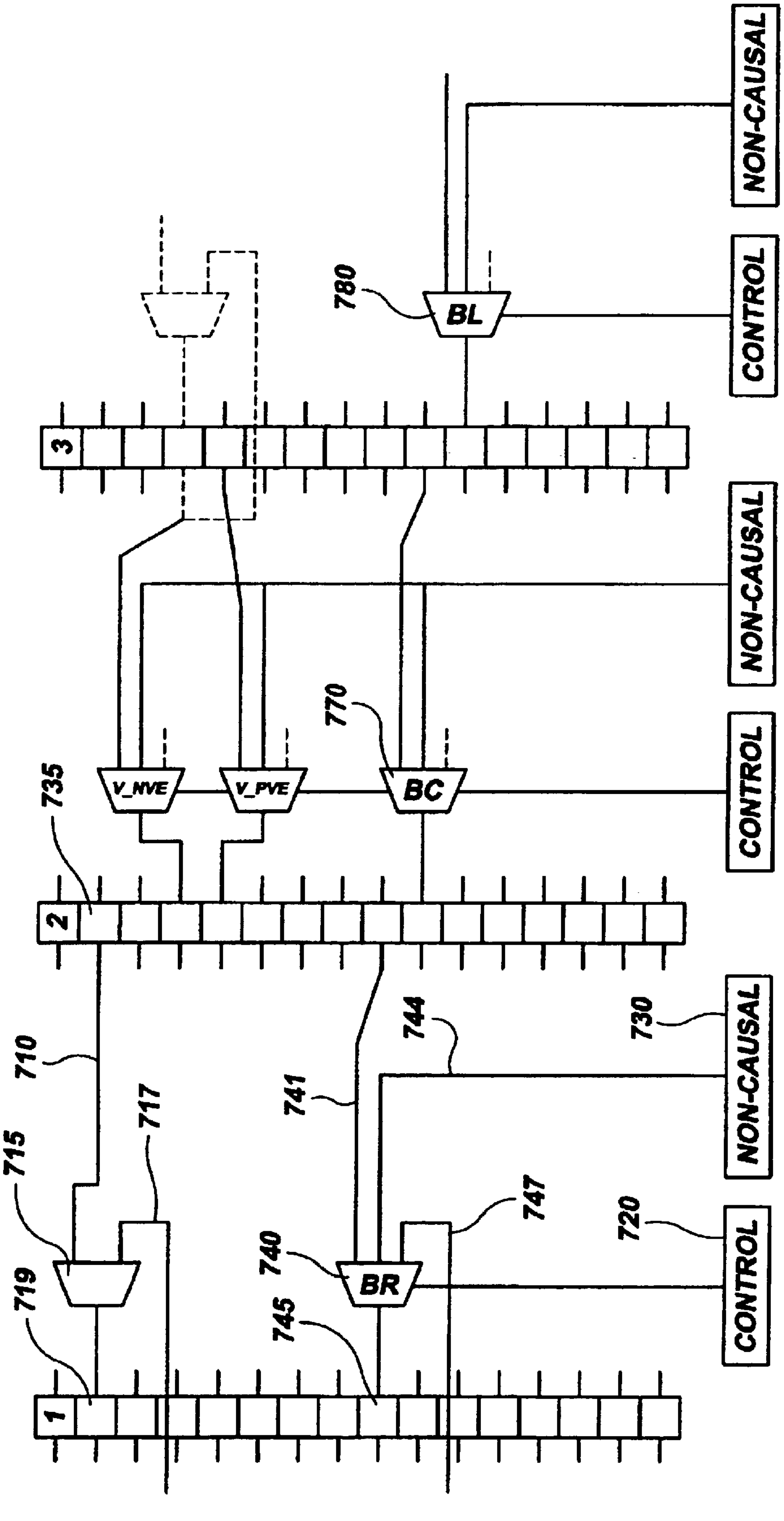
FIGS. 10–14 are graphical representations of Registers 1–18 in FIG. 6 showing the additional control logic employed in the Context Vector Codec according to the presently preferred embodiment of the present invention.

FIGS. 10–14 show the context vector registers labelled 1–18 in FIG. 6 with their accompanying digital logic. FIG. 10 shows the series of three 16-bit registers at the top of the labelled registers in FIG. 6. During a load_context instruction, Register 3 takes the input from the Context Vector Memory, while the bits of the context vector previously stored in Register 3 are shifted to Register 2, and the bits of the context vector previously stored in Register 2 are shifted to Register 1. Although not shown for all the bits in FIGS. 10–14, each bit in each context vector register shifts over to its corresponding position in the next register, as shown by dotted line 710 in FIG. 10. Furthermore, each line 710 connecting corresponding bit positions has a multiplexer (MUX) 715 which provides input to the next bit 719. MUX 715 has two inputs: input 710 is the bit value from the corresponding bit position 735 from the previous register, and feedback 717 is the bit value of bit 719. Except for the MUXes that are explicitly shown in FIGS. 10–14, each bit position is connected to the next bit position in the registers of FIGS. 10–14 in the same manner as MUX 715. Because these MUXes are essentially used for transfer flow between registers, they can also be called transfer MUXes. The MUXes that are explicitly shown in FIGS. 10–14 are all three (or four) input MUXes with specialized tasks which will be described in greater detail below. The two input transfer MUXes with their input and output lines are not shown in order to focus on the specialized three and four input MUXes (and to avoid confusion).

All of the MUXes (MUX 715, the transfer MUXes, and all the other MUXes in FIGS. 10–14) are under the control of Control 720, which is common to all parts of the Context Vector Codec/Generator (i.e., all of the boxes labeled "Control" in FIGS. 10–14 are the same Control 720). Control 420 is shown as a simple block for at least two reasons: 1) it simplifies the drawings; and 2) the exact construction of Control 420 may vary according to different embodiments. The construction of Control 420 is affected by the amount the Context Vector Codec/Generator is integrated with the rest of the codec. For example, Control 420 may control only the Context Vector Codec/Generator 420 (and perhaps Context Vector Memory 410) in FIG. 5 or it may control all of the elements in FIG. 5. If controlling all the elements, Control 420 would be more complex; if controlling only the Context Vector Codec/Generator, Control 420 will be simple. In one of its simplest form, Control 420 comprises in essence a lookup table which lists each combination of control signals appropriate for each combination of results from scanning the current stripe. These could be indexed by control indices which the host processor uses to direct the appropriate control signals be sent to the MUXes based on the current scan results.

Thus, the implementation of Control 420 can take a myriad of forms, depending on the embodiment. The complexity and exact nature of the implementation of Control 420 will depend on how the Context Vecter Codec/Generator 420 is integrated with the remaining parts of the block codec (and the entire JPEG2000 codec). In the more integrated and complex embodiments of Control 420, it may take the form of a "mini-controller" for a number of interacting components in the codec.

Non-causal 730 is set at the start of processing and is used to indicate whether the context vectors are handled in a vertically causal context formation. Non-causal 730 is common to the top registers in the Context Vector Codec/ Generator. Vertically causal context formation coding constrains the context formation to the current and past code-block scans (four rows of vertically scanned samples). That is, any coefficient from the next code-block scan are considered to be insignificant. Because the quantized coefficients being analyzed in the Context Vector Codec/ Generator correspond to Registers 8, 9, 10, and 11, they represent coefficients in the next, i.e., future, code-block scan for the quantized coefficients corresponding to Registers 1, 2, and 3. The causality bit in the block master data structure provides the causality information that sets Non-causal 730 (Non-causal 730 contains the inverted version of the causality bit). Therefore, when in a vertically causal context formation, Non-causal 730 is zero, thereby causing the scanning of the lower coefficients to have no effect on the bits in Registers 1, 2, and 3. Non-causal input is only necessary for these top three registers.

During process_stage_1, Control 720 might change the value of certain bit-positions in Registers 1, 2, and 3 based on the scanning of the first quantized coefficient in the stripe (which corresponds to the context vector in Register 8). For instance, if the first quantized coefficient was significant, the bit BR in Register 1, BC in Register 2, and BL in Register 3 would need to be changed to the bit value of Non-Causal 730. Thus, if this is a vertically causal context formation, the value of BR, BC, and BL would be 0 (Non-causal=0 because the causality bit=1) and if not, the value of BR, BC, and BL would be 1 (Non-causal=1 because the causality bit=0). In order to accomplish this, Control 720 instructs three input MUX BR 740 to select input line 744 (the Non-causal value) rather than input 741 (or feedback line 747) so that BR bit 745 becomes the binary value on input line 744. Control 720 would also direct BC MUX 770 and BL MUX 780 to perform the same action in their registers. Furthermore, because the coefficient corresponding to Register 8 is vertically contiguous with Register 2, the sign of the current quantized coefficient (if significant) will need to be indicated by bit V_NVE (negative) or bit V_PVE (positive) in Register 2.

Figure 11:
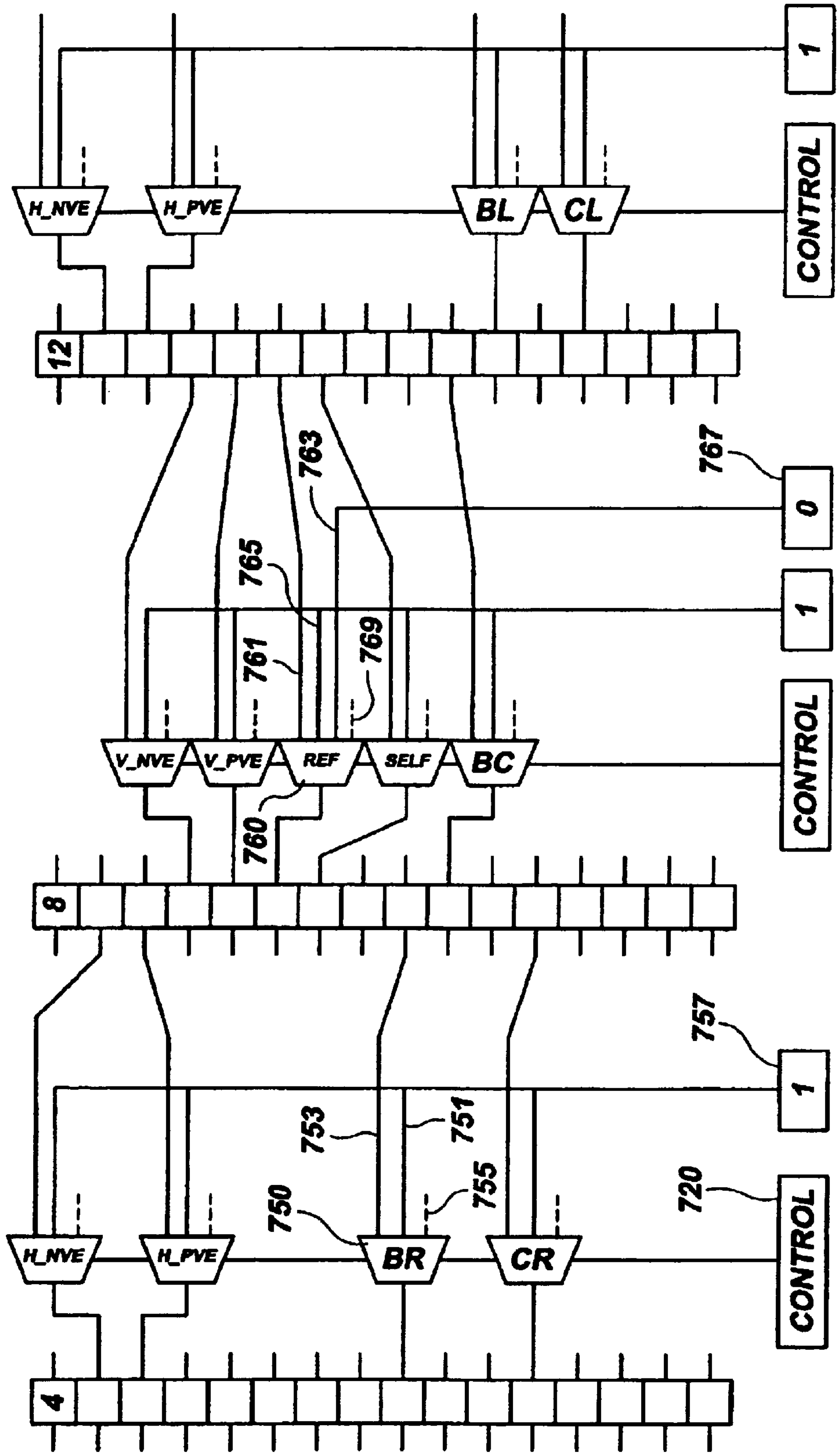

In FIG. 11, the next three 16-bit registers (or, more precisely, register-sections of the larger middle 64-bit registers) are shown with their accompanying control logic. The 16-bit context vector first enters Register 12 on the right-hand side. Once again Control 720 controls the MUXes which can change the input to certain bit positions in each register. Like the MUXes shown in FIG. 10, each MUX (e.g., MUX 750) shown in FIG. 11 (and FIGS. 12–14) has three inputs: a direct input from the previous register to the right (e.g., line 753), feedback such as from 715 in FIG. 10 (e.g., line 755), and input from a line (e.g., line 751) which is permanently wired either to a 1 (e.g., box 757) or to a 0 (e.g., box 767). As an example, Control 720 can direct the three input MUX 750 to output one of: 1) the bit value shifting out of the previous register on line 753; 2) the bit value 1 on line 751; or 3) the bit value shifting out of the next register on line 755 (not completely shown).

The one exception to this three input MUX configuration (and the two input transfer MUX configuration not shown) is the REF MUX 760 in Registers 8, 9, 10, and 11 (these correspond to the current quantized coefficient stripe). Looking at the example of REF MUX 760 before Register 8 in FIG. 11, it can be seen that it has four inputs: a direct input (from the previous register) 761, a 0 input 763, a 1 input 765, and a feedback input 769 (line not completely shown). The direct input 761, the 1 input 765, and the feedback input 769 are similar in function to the same inputs 753, 751, and 755, respectively, for BR MUX 750. The 0 input 763 provides an additional choice, thereby allowing Control 720 to select from 1, 0, direct input, or feedback for that bit position value.

Figure 12:
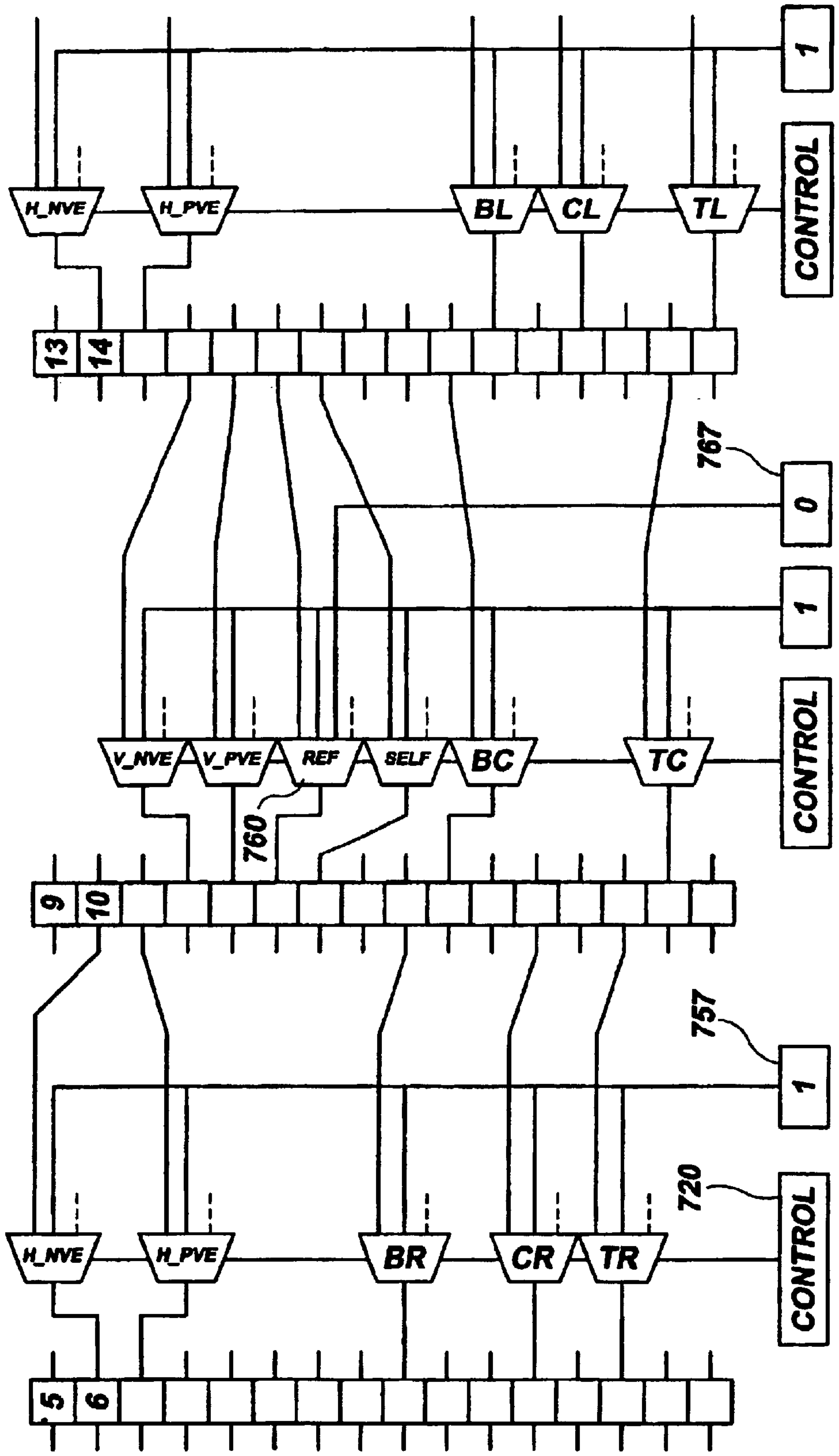
Figure 13:
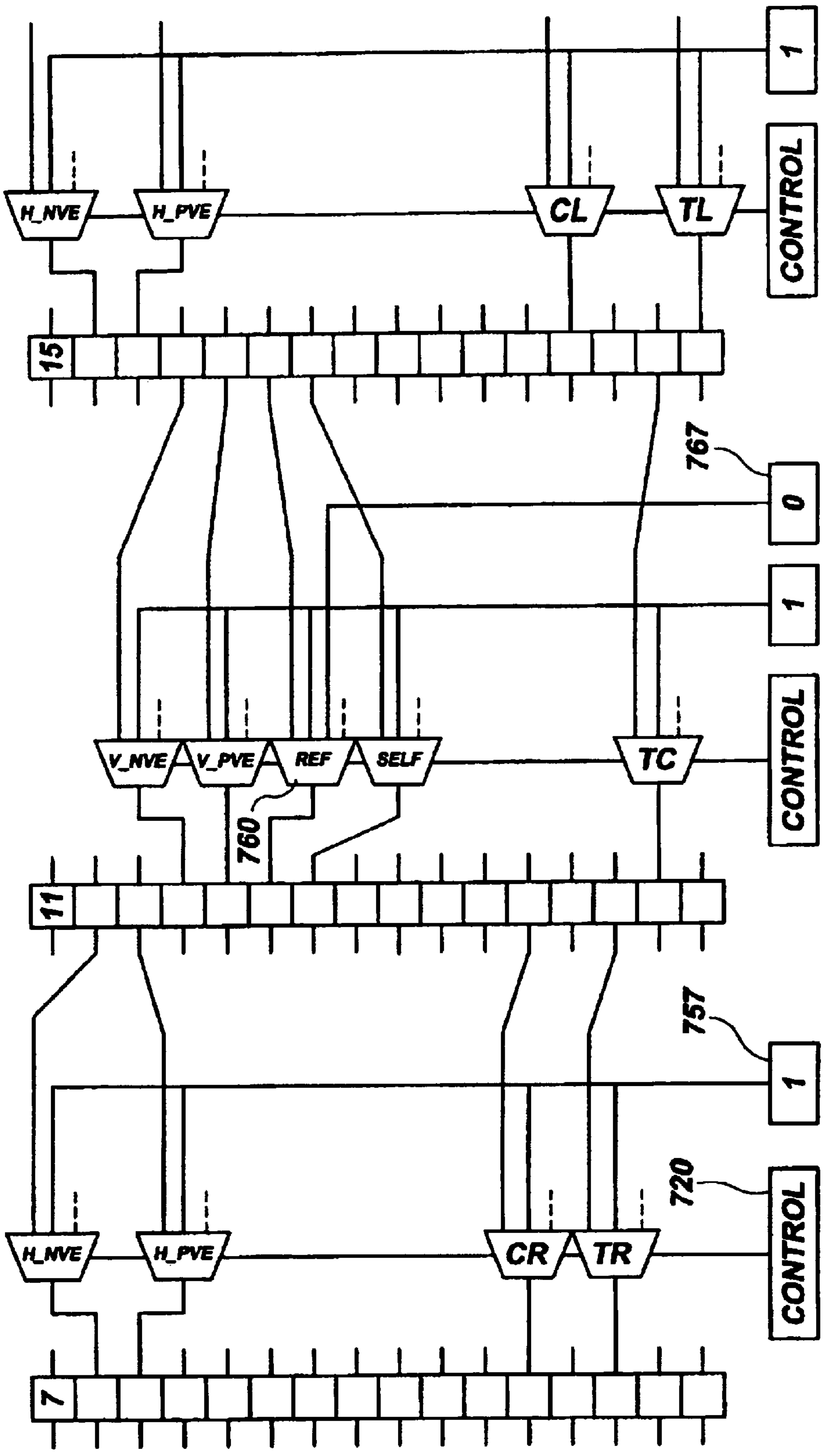
Figure 14:
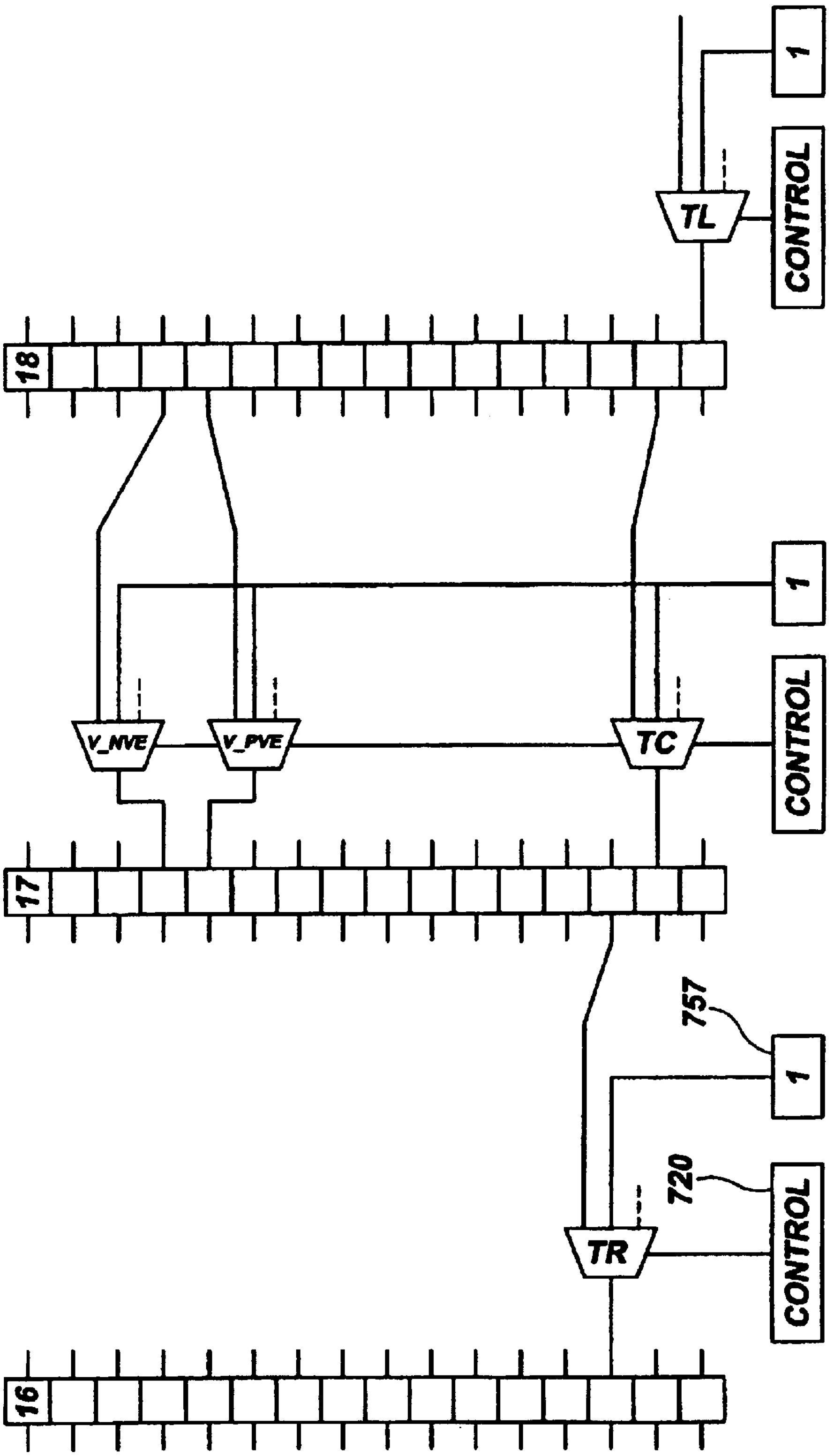

The remaining registers in FIGS. 12, 13, and 14 behave in a manner similar to the registers described in reference to FIGS. 10 and 11. It should be noted that certain MUX choices depend merely upon the process, and will not be affected by the state of the control registers. For instance, in a load_context instruction, the direct input will always be chosen to shift the values over one register to the left. Furthermore, depending on how the MUX functions are implemented, more or less digital logic gates may be needed as would be known to one skilled in the art. For instance, if one was using programmable logic gates, it might be necessary to add more gates because such gates cannot be directly connected to 1 (operating voltage $V_{dd}$) or 0 (ground).

Figure 15:
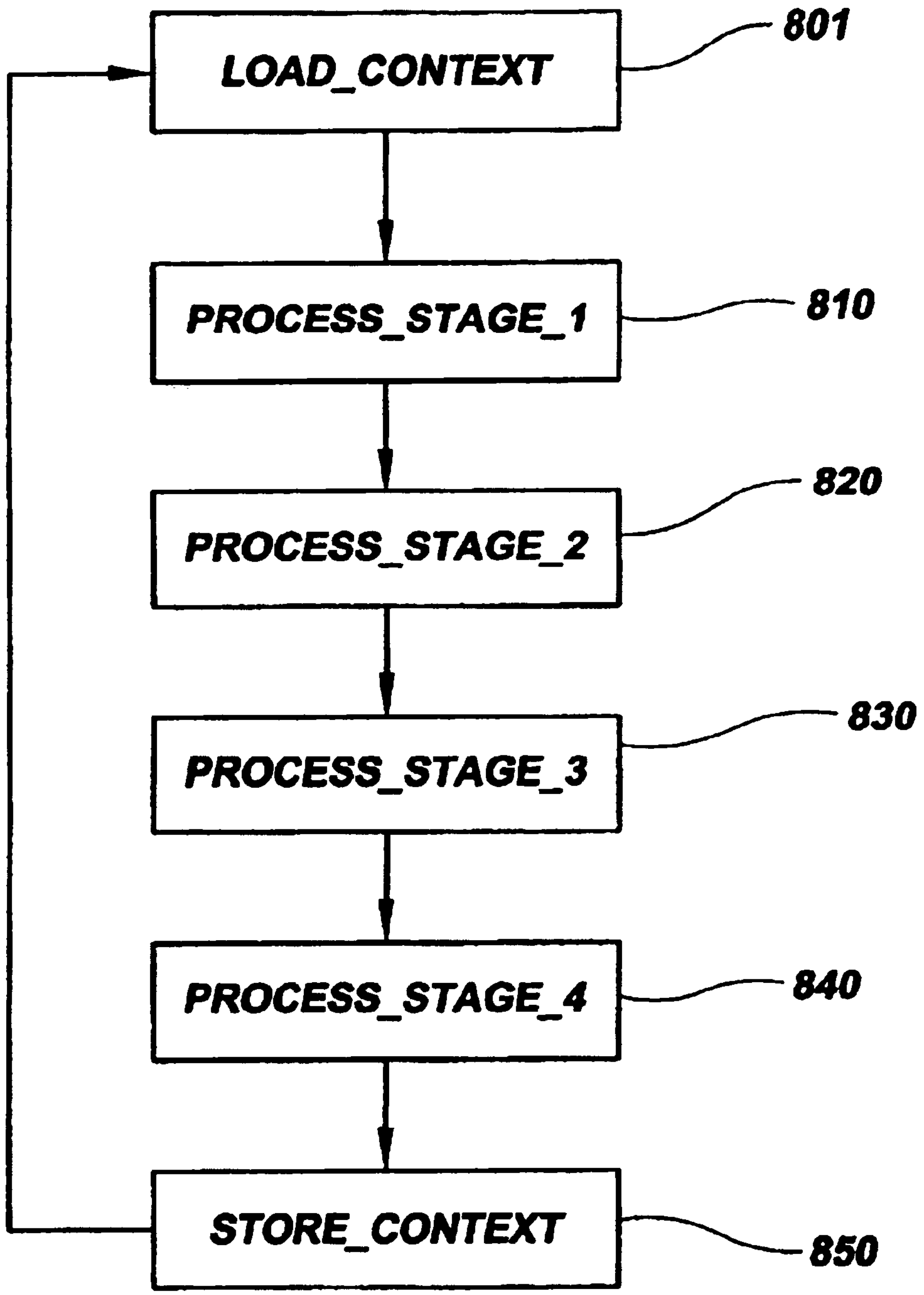
FIG. 15 is a flowchart of a procedure according to the presently preferred embodiment of the present invention.

A method according to the presently preferred embodiment is shown in FIG. 15. For the steps in FIG. 15, it is assumed that the Context Vector Codec/Generator is in pipeline mode, i.e., where multiple load and/or store instructions overlap in execution. In load_context step 801, new context vectors from the Context Vector Memory are loaded into the rightmost column of registers in the Context Vector Codec/Generator, while the previous contents of those registers are moved over to the middle column of registers, whose previous contents are moved to the left-most column of registers. In process_stage_1 step 810, the results of scanning the first (top) quantized coefficient in the current stripe are used to modify the appropriate bits in the registers of the Context Vector Codec/Generator. In process_stage_2 step 820, the results of scanning the second quantized coefficient in the current stripe are used to modify the appropriate bits in the registers of the Context Vector Codec/ Generator. In process_stage_3 step 830, the results of scanning the third quantized coefficient in the current stripe are used to modify the appropriate bits in the registers of the Context Vector Codec/Generator. In process_stage_4 step 840, the results of scanning the fourth quantized coefficient in the current stripe are used to modify the appropriate bits in the registers of the Context Vector Codec/Generator. Lastly, store_context step 850 stores the content vectors from the left-most column of registers back into the Context Vector Memory. Then, the procedure repeats for the next stripe being scanned.

If the Context Vector Codec/Generator is controlled by a host processor, the steps in FIG. 15 are the same in both encoding and decoding. The refined instruction is performed after or during each processing step, depending on the implementation of the Context Vector Codec/Generator. If controlled by instructions sent from a host processor, it is possible that the refinement steps can be done in parallel with the processing steps, providing that there are enough extra bits in the instruction word from the host processor to signal refinement updates. If there are not enough bits or the context buffer values are not otherwise modified, this must be done using separate instructions.

In order to further clarify the operations performed during the various hardware processes of the Context Vector Codec/ Generator, an appendix of exemplary code (APPENDIX) from the software verification model is attached. In the appendix, lines of code corresponding to process_stage_1 in different encoding and decoding procedures are presented. A comparison between performing the same functions in software and hardware show the superiority of using the hardware Context Vector Codec/Generator. When running the software verification code on an Intel Pentium II processor, a total of 144 memory operations are required to process all 18 context vectors. On the other hand, when operating in pipeline mode, the Context Vector Codec/Generator only requires 3 64-bit loads and 3 64-bit stores (with an additional 6 loads at the beginning of the pipeline and 6 stores at the end of the pipeline). Thus, these 18 memory transfer operations in hardware are at least 8 times more efficient than the 144 memory operations required in software. These figures were obtained using a Microsoft Visual C debugger analyzing the disassembly code (JPEG2000 VM7.2 C-source code).

Figure 16:
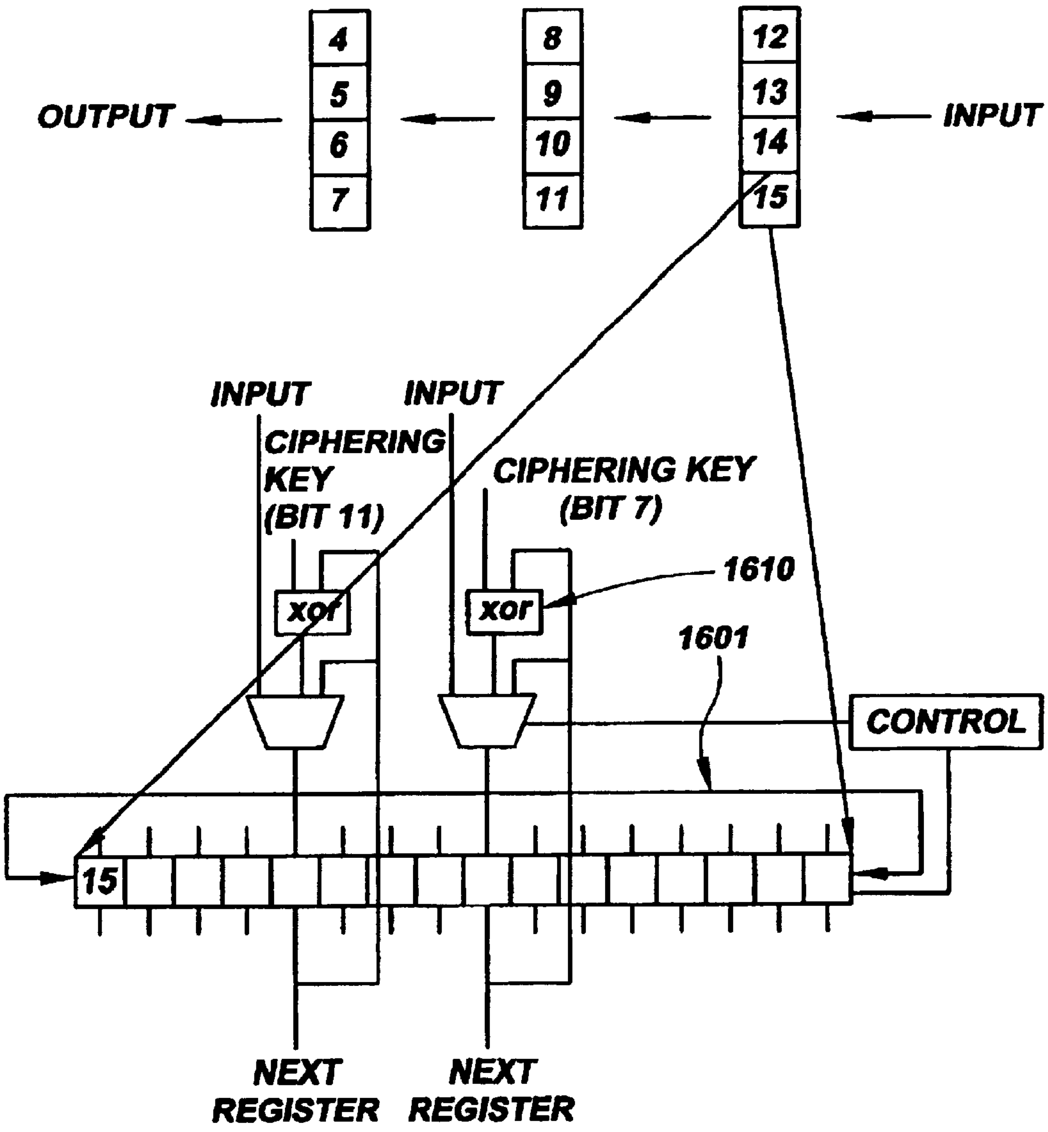
FIG. 16 is a graphical representation of Registers 4–15 in an encryption/decryption embodiment with a magnified view of Register 15, according to another embodiment of the present invention.

Some embodiments of the present invention can also be used for "ciphering" functions. In such "ciphering" embodiments, the parallel registers of FIG. 6 would also work as barrel registers so that the context vectors could shift bit by bit within each register, as shown in FIG. 16. FIG. 16 shows the three sets of four center section registers at the top and a magnified view of Register 15 at the bottom. Unlike the registers in FIGS. 10–14, the bits in Register 15 can shift either left or right within the register. The bit at one end of the register will loop around to the other end when shifting, as shown by line 1601. The bits can shift by any number between 1 and 16 bits. In this ciphering embodiment, re-programmable logic gates are being used as MUXes, which means that this embodiment can switch back and forth between being a Context Vector Codec/Generator and a ciphering engine. The cipher key can be either hard-wired or stored in other registers and then downloaded. The encrypting is performed by manipulating the bits, as, for example, the bits in Register 15 can be both rotated and XORed (using an XOR gate such as XOR 1610) with the cipher key. In this embodiment, all the digital gates controlling the input to the context vector registers (including those gates not shown) are re-programmable logic gates, and each gate has an XOR gate with an appropriate cipher key input.

As stated above, the hardware Context Vector Codec/Generator could be a stand-alone co-processor, a part of a dedicated hardware JPEG2000 codec, a part of a larger hardware accelerator block for performing some of the functions of a JPEG2000 codec, or part of a processor which performs the remaining functions of the JPEG2000 codec in code. Furthermore, the Context Vector Codec/Generator according to the present invention is scalable. In other words, although 3 parallel 64-bit registers were shown in the presently preferred embodiment as the input and output, a greater parallel structure could be created so that a multitude of stripes are processed in parallel, rather than serially (e.g., 8 parallel 64-bit registers capable of processing all the stripes of a 32×32 code-block simultaneously). Because of these and other features, a Context Vector Codec/Generator according to the present invention can provide an efficient and economical speed-up in coding/decoding JPEG2000 files in a wide variety of computing environments.

While there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

APPENDIX

JPEG2000 ENCODING (SECTION OF FIRST_PASS_FUNCTION)

```
ctxt = cp[0];
    if (ctxt & IS_REFINED)
        cp[0] = ctxt & ~IS_REFINED;
    else if (!(ctxt & (SELF_SIG | OUT_OF_BOUNDS)))
        {
            val = dp[0];
            symbol = (val & mask);
            csp = csp_base + (ZC_OFFSET + zc_lut[ctxt & ZC_MASK]);
            dst_emit_symbol(areg,creg,ct,state,symbol,csp); /* arithmetic encoding */
            if (symbol)
                { /* New significant value; update contexts & code sign */
new_sig0:
                    sign = val & MIN_IFC_INT; /* Save sign bit. */
                    val &= MIN_IFC_INT;
                    val >>= mse_downshift; val <<= mse_upshift;
                    assert(val == (val & MSE_LUT_MASK));
                    cell->delta_mse += mse_lut[val];
                    symbol = ebcot_sc_lut[(ctxt>>SIGN_POS)&0x00FF];
                    csp = csp_base + SC_OFFSET + (symbol & 0x000F);
                    symbol &= MIN_IFC_INT;
                    symbol ^= sign;
                    dst_emit_symbol(areg,creg,ct,state,symbol,csp); /* arithmetic encoding */
                    cp[0]               = ctxt | SELF_SIG;
                    cp[(-stripe_gap+3)-4] |= (non_causal << BR_POS);
                    cp[(-stripe_gap+3)+4] |= (non_causal << BL_POS);
                    cp[1-4]             |= TR_SIG;
                    cp[1+4]             |= TL_SIG;
                    if (sign)
                        {/* Negative sample. */
                            cp[4]    |= CL_SIG | H_NVE_SIG;
                            cp[-4]   |= CR_SIG | H_NVE_SIG;
```

APPENDIX-continued

```
                        cp[(-stripe_gap+3)]|= (non_causal << BC_POS) | (non_causal << V_NVE_POS);
                        cp[1]      |= TC_SIG | V_NVE_SIG;
                    }
                else
                    {/* Positive sample. */
                        cp[4]      |= CL_SIG | H_PVE_SIG;
                        cp[-4]     |= CR_SIG | H_PVE_SIG;
                        cp[(-stripe_gap+3)]|= (non_causal << BC_POS) | (non_causal << V_PVE_POS);
                        cp[1]      |= TC_SIG | V_PVE_SIG;
                    }
            }
        }
    ctxt = cp[1];
. . .
```

ctxt marks the content vector which corresponds to context vector register numbet 8.
First, the refinement bit of this ctxt is checked by the control unit and if this context vector is already refined this bit is turned off.
If context vector is not refined yet and SELF_SIG and OUT_OT_BOUNDS bits are zero, the operation begins.
val marks the wavelet coefficient value, which is located in the same position as ctxt.
First this val is processed using bitplane mask and this information is send to arithmetic encoder.
If this value has significance, the context vector registers & code sign are updated.
Sign information is extracted from val and the symbol information is retrived from LUT (lookup table).
Symbol information is sent to arithmetic coder and the context vector values are processed depending on the sign information.

JPEG2000 DECODING (SECTION OF FIRST_PASS_FUNCTION)

```
ctxt = cp[0];
    if (!(ctxt & (SELF_SIG | OUT_OF_BOUNDS | IS_REFINED)))
        {
            csp = csp_base + (ZC_OFFSET + zc_lut[ctxt & ZC_MASK]);
            dst_get_symbol_skewed(areg,creg,thresh,cum_delta, ct,state symbol,csp); /* arithmetic decoding */
            if (symbol)
                {/* New significant value; update contexts & get sign. */
new_sig0:
                    val = ebcot_sc_lut[(ctxt>>SIGN_POS)&0x00FF];
                    csp = csp_base + SC_OFFSET + (val & 0x000F);
                    val &= MIN_IFC_INT;
                    dst_get_symbol_skewed(areg,creg,thresh,cum_delta, ct,state,symbol,csp); /* arithmetic decoding */
                    val ^= (symbol << (IMPLEMENTATION_PRECISION-1));
                    ctxt |= SELF_SIG;
                    cp[(-stripe_gap+3)-4] |= (non_causal << BR_POS);
                    cp[(-stripe_gap+3)+4] |= (non_causal << BL_POS);
                    cp[1-4]     |=TR_SIG;
                    cp[1+4]     |=TL_SIG;
                    if (val)
                        { /* Negative sample. */
                            cp[4]      |= CL_SIG | H_NVE_SIG;
                            cp[-4]     |= CR_SIG | H_NVE_SIG;
                            cp[(-stripe_gap+3)]|= (non_causal << BC_POS) |
                                       (non_causal << V_NVE_POS);
                            cp[1]      |= TC_SIG | V_NVE_SIG;
                        }
                    else
                        { /* Positive sample. */
                            cp[4]      |= CL_SIG | H_PVE_SIG;
                            cp[-4]     |= CR_SIG | H_PVE_SIG;
                            cp[(-stripe_gap+3)]|= (non_causal << BC_POS) |
                                       (non_causal << V_PVE_POS);
                            cp[1]      |= TC_SIG | V_PVE_SIG;
                        }
                    val |= lsb + (lsb>>1);
                    dp[0] = val; /* Write new non-zero value back to buffer. */
                }
        }
    cp[0] = ctxt & ~IS_REFINED;
    ctxt = cp[1];
. . .
```

ctxt marks the context vector which is processed by context vector register number 8.
If IS_REFINED and SELF_SIG and OUT_OF_BOUNDS bits of this ctxt are zero, the operation begins by retrieving the symbol information from the arithmetic decoder.
The later steps depend upon whether the symbol is one or zero.
Val marks the wavelet coefficient value, which is located in the same position as ctxt.
Part of this value is retrieved from the LUT and part of it is retrieved from the arithmetic decoder.
After scanning the wavelet coefficient value the context vector register is updated.

APPENDIX-continued

JPEG2000 ENCODING (SECTION OF ZERO__REFINEMENT__PASS__FUNCTION)

```
val = dp[0];                /* process__stage __1 processes the first stripe location */
symbol = (val & mask);  /* symbol value is generated for correct bit-layer under process */
csp = csp__base + (ZC__OFFSET + zc__lut[ctxt & ZC__MASK]);
dst__emit__symbol(areg,creg,ct,state,symbol,csp);
if (symbol)        /* if symbol is set, then process the context vectors */
{                  /* New significant value; update contexts & code sign */
                   /* this part of operation, where sign, val and symbol value are processed, */
                            /* is performed by components shown in FIG. 5 */
    ifc__int sign;
    sign = val & MIN__IFC__INT;     /* Save sign bit. */
    val &= MAX__IFC__INT;
    val >>= mse__downshift; val <<= mse__upshift;
    assert(val == (val & MSE__LUT__MASK));
    cell->delta__mse += mse__lut[val];
    symbol = ebcot__sc__lut[(ctxt>>SIGN__POS)&0x00FF];
    csp = csp__base + SC__OFFSET + (symbol & 0x000F);
    symbol &= MIN__IFC__INT;
    symbol ^= sign;
    dst__emit__symbol(areg,creg,ct,state,symbol,csp);
                            */ this part is processed by Context Vector Codec/Generator core */
    ctxt |= SELF__SIG;
    cp[(-stripe__gap+3)-4] |= (non__causal << BR__POS);
    cp[(-stripe__gap+3)+4] |= (non__causal << BL__POS);
    cp[1-4]                |= TR__SIG;
    cp[1+4]                |= TL__SIG;
    if (sign)
    {/* Negative sample. */
        cp[4]                  |= CL__SIG | H__NVE__SIG;
        cp[-4]                 |= CR__SIG | H__NVE__SIG;
        cp[(-stripe__gap+3)])=  (non__causal << BC__POS) |
                               (non__causal << V__NVE__POS);
        cp[1]                  |= TC__SIG | V__NVE__SIG;
    }
    else
    {/* Positive sample. */
        cp[4]                  |= CL__SIG | H__PVE__SIG;
        cp[-4]                 |= CR__SIG | H__PVE__SIG;
        cp[(-stripe__gap+3)])=  (non__causal << BC__POS) |
                               (non__causal << V__PVE__POS);
        cp[1]                  |= TC__SIG | V__PVE__SIG;
    }
}
```

What is claimed is:

1. A device for generating context vectors during encoding or decoding in a block coder of a discrete wavelet transform (DWT) codec comprising:

a plurality of first digital logic gates for receiving incoming context vectors;

a plurality of first context vector registers for receiving context vectors from said first digital gates;

a plurality of second digital logic gates for receiving context vectors from said first context vector registers;

a plurality of second context vector registers for receiving context vectors from said second digital logic gates;

a plurality of third digital logic gates for receiving context vectors from said second context vector registers;

a plurality of third context vector registers for receiving context vectors from said third digital logic gates; and a control unit for controlling said first, second, and third digital logic gates in order to output bits to the first, second, and third context veptor registers, respectively, based on the results of scanning a current stripe of quantized DWT coefficients;

wherein each plurality of context vector registers comprises a top, center, and bottom section; and wherein the center section of said second context vector registers holds the context vectors corresponding to the current stripe of quantized DWT coefficients.

2. The device as recited in claim 1, wherein the DWT codec is part of a JPEG2000 codec.

3. The device as recited in claim 2, wherein each of the top, center, and bottom sections of the first, second, and third context vector registers comprises a 64-bit register for holding 4 16-bit context vectors.

4. The device as recited in claim 3, further comprising:

a plurality of first multiplexers (MUXs) comprising said first digital logic devices, wherein each of said first MUXs comprises:

an output port for outputting a bit value to a target bit location in a context vector in the first context vector registers, a first input port for receiving a bit value from a corresponding bit location in an incoming context vector, and a second input port for receiving a bit value fed back from an output of the target bit location in the context vector in the first context vector registers;

a plurality of second MUXs comprising said second digital logic devices, wherein each of said second MUXs comprises:

an output port for outputting a bit value to a target bit location in a context vector in the second context vector registers, a first input port for receiving a bit value from an output of a corresponding bit location in a context vector in the first context vector registers, and a second input port for receiving a bit value fed back from an output of the target bit location in the context vector in the second context vector registers; and a plurality of third MUXs comprising said third digital logic devices, wherein each of said third MUXs comprises:

an output port fo outputting a bit value to a target bit location in a context vector in the third context vector registers, a first input for receiving a bit value from an output of a corresponding bit location in a context vector in the second context vectors, and a second input for receiving a bit value fed beck from an output of the target bit location in context vector in the third context vector registers.

5. The device as recited in claim 4, wherein certain MUXs of the first, second, and third MUXs have target bit locations which contain a bit value which may be affected by the results of scanning the current stripe of quantized DWT coefficients, said certain MUXs further comprising:

a third input for receiving one of an input with a bit value of 1 and a non-causal bit input, wherein the non-causal bit input is an inverted version of a causality bit in a block master data structure.

6. The device as recited in claim 5, wherein said certain MUXs further comprise:

a fourth input for receiving an input with a bit value of 0.

7. The device as recited in claim 1, wherein the first, second, and third logic gates comprise:

a plurality of re-programmable logic gates.

8. The device as recited in claim 7, wherein the first, second, and third context vector registers are barrel registers and the context vector generating device also functions as an encryption/decryption device.

9. The device as recited in claim 8, further comprising:

XOR gates connected to inputs of the re-programmable logic gates for XOR-ing a bit value with a cipher key bit value.

10. The device as recited in claim 1, wherein the bits in the new context vectors are initialized to a 0 bit value.

11. A method for generating context vectors during encoding or decoding in a block coder of a discrete wavelet transform (DWT) codec comprising the steps of:

a) loading new context vectors from context vector memory into a plurality of first digital logic gates;

b) outputting current first context vectors corresponding to quantized coefficients of at least one future scanning stripe and two vertically neighboring quantized coefficients from the first digital logic gates into a plurality of first context vector registers, wherein said outputting is controlled by the results of scanning at least one current scanning stripe;

c) loading previous first context vectors from the first context vector registers into a plurality of second digital logic gates;

d) outputting current second context vectors corresponding to quantized coefficients of the at least one current scanning stripe and two vertically neighboring quantized coefficients from the second digital logic gates into a plurality of second context vector registers, wherein said outputting is controlled by the results of scanning the at least one current scanning stripe;

e) loading previous second context vectors from the second context vector registers into a plurality of third digit logic gates; and f) outputting current context vectors corresponding to quantized coefficients of at least one previous scanning stripe and two vertically neighboring quantized coefficients from the third digital logic gates into a plurality of third context vector registers, wherein said outputting is controlled by the results of scanning the least one current scanning strip.

12. The method as recited in claim 11, wherein said steps a), c), and e) are performed substantially simultaneously and said steps b), d), and f) are performed substantially simultaneously.

13. The method as recited in claim 11, wherein said steps a), b), c), d), e), and f) are performed substantially simultaneously.

14. The method as recited in claim 11, further comprising the step of:

g) repeating steps a) through f).

15. The method as recited in claim 11, wherein said step a) comprises:

loading a bit value from bit location in each new context vector into each of the first digital logic gates.

16. The method as recited in claim 15, wherein said step b) comprises:

controlling each of the first digital logic gates to output to a target bit location in each of the first context vector registers one of:

the loaded bit value, a bit value fed back from the target bin location, a bit value of 1, a bit value of 0, and a bit value of a non-causal bit, wherein the non-causal bit is an inverted version of a causality bit in a block master data structure.

17. The method as recited in claim 11, wherein said step c) comprises:

loading a bit value from a bit location in each previous first context vector into each of the second digital logic gates.

18. The method as recited in claim 17, wherein said step d) comprises:

controlling each of the second digital logic gates to output to a target bit location in each of the second context vector registers one of:

the loaded bit value, a bit value fed back from the target bin location, a bit value of 1, a bit value of 0, and a bit value of a non-causal bit, wherein the non-causal bit is an inverted version of a causality bit in a block master data structure.

19. The method as recited in claim 11, wherein said step e) comprises:

loading a bit value from a bit location in each previous second context vector into each of the third digital logic gates.

20. The method as recited in claim 19, wherein said step f) comprises:

controlling each of the third digital logic gates to output to a target bit location in each of the third context vector registers one of:

the loaded bit value, a bit value fed back from the target bin location, a bit value of 1, a bit value of 0, an a bit value of a non-causal bit, wherein the non-causal bit is an inverted version of a causality bit in a block master data structure.

21. The method as recited in claim 11, wherein the context vector registers are barrel registers, the method further comprising the step of:

encrypting/decrypting contents of the first, second, and third context vector registers by at least one of:

rotating bit values within each context vector barrel register by a predetermined number of bits the loaded bit value, and XORing bit values within each context vector by bit values of a cipher key.

22. The method as recited in claim 11, wherein the DWT codec is part of a JPEG2000 codec.

23. The method as recited in claim 11, wherein said step a) comprises:

initializing the bit values in the new context vectors to a 0 bit value.

* * * * *